United States Patent

Nagata et al.

[15] 3,697,619
[45] Oct. 10, 1972

[54] A COATING COMPOSITION OF A COPOLYMER OF METHYL METHACRYLATE WITH THE POLYMERIZABLE ADDITION REACTION PRODUCT OF AN α,β-ETHYLENICALLY UNSATURATED ACID AND AN EPOXY COMPOUND

[72] Inventors: Nobuyoshi Nagata, 177 Gakuen-Daiwacho-4-chome, Nara-shi; Ryuzo Mizuguchi, 1736 Mashita-Shimokama Mishimacho, Osaka, both of Japan

[22] Filed: Dec. 18, 1969

[21] Appl. No.: 886,419

Related U.S. Application Data

[63] Continuation-in-part of Ser. No. 653,321, July 14, 1967, abandoned.

[52] U.S. Cl. ................260/836, 260/17, 260/30.6, 260/31.8 M, 260/41 R, 260/80.8, 260/837, 117/132 BE
[51] Int. Cl. ..............................................C09d 3/80
[58] Field of Search..............................260/836, 837

[56] References Cited

UNITED STATES PATENTS

| | | | |
|---|---|---|---|
| 3,301,743 | 1/1967 | Fekete et al. | 260/837 X |
| 3,373,075 | 3/1968 | Fekete et al. | 260/837 X |
| 3,507,821 | 4/1970 | Vasta | 260/836 X |
| 3,524,902 | 8/1970 | Feltzin et al. | 260/836 X |

*Primary Examiner*—William H. Short
*Assistant Examiner*—L. M. Phynes
*Attorney*—Beveridge & De Grandi

[57] ABSTRACT

A liquid coating composition is formed by copolymerizing without gelation, 50–95 parts by weight of a methyl methacrylate lacquer-giving monomer component and 5–50 parts by weight of a polymerizable addition reaction product obtained by the addition reaction of an α,β-ethylenically unsaturated acid and an epoxy compound. In those instances where a polyepoxy compound (e.g., diepoxide) is used, the addition reaction is controlled to the extent that a sufficient amount of monoester and an insufficient amount of diester are formed so that substantially no gelatin occurs during copolymerization and/or formation of the coating composition. Films are formed from the coating composition which exhibit excellent durability, impact resistance, shrink resistance, and gasoline resistance.

7 Claims, No Drawings

3,697,619

COATING COMPOSITION OF A COPOLYMER OF METHYL METHACRYLATE WITH THE POLYMERIZABLE ADDITION REACTION PRODUCT OF AN α,β-ETHYLENICALLY UNSATURATED ACID AND AN EPOXY COMPOUND

CROSS-REFERENCE

This application is a continuation-in-part of our copending application Ser. No. 653,321 filed July 14, 1967, now abandoned.

This invention relates to coating compositions and films formed therefrom. Most particularly, this invention relates to improved methyl methacrylate lacquers which form films of exceedingly high quality.

Generally, films formed from a lacquer containing methyl methacrylate polymer as a main film-forming component exhibit, to a high degree, the desirable properties of being color-free and transparent, as well as having good gloss retention and resistance to yellowing. Unfortunately, such films tend to suffer not only from the problem of cracking when they are subjected to expansion and contraction caused by temperature variations, but also from the problem of swelling and shrinking when contacted by moisture. Furthermore, these films are often undesirably low in impact resistance and exhibit poor adhesive characteristics. The problems of shrinking and cracking are particularly prevalent when the lacquers are applied to other films or are applied as a recoat upon themselves.

In order to overcome such drawbacks as cracking and inferior capability of being recoated, the art has produced methyl methacrylate lacquers by copolymerizing methyl methacrylate with about 2–30 percent by weight of another monomer as an intraplasticizing monomer, particularly an acrylate or methacrylate of an alkanol having two to 22 carbon atoms. However, when a methyl methacrylate lacquer film has been so improved to prevent cracking or to improve its capability of being recoated, the film is generally low in gasoline resistance. This is ascribable to the fact that the intraplasticizing monomer employed is highly compatible with gasoline. Thus, the greatest problem of the conventional methyl methacrylate lacquers comprising a polymer composed mainly of a methyl methacrylate monomer is that the art has not been able to obtain a copolymer composition which properly balances, at sufficiently high levels, the important properties of crack resistance, shrink resistance, recoatability, and gasoline resistance.

The present invention overcomes the above-described problem by providing a coating composition comprising an organic solvent soluble copolymer obtained by the copolymerization reaction of (a) 50–95 parts by weight and preferably 55–95 parts by weight of a methyl methacrylate lacquer-giving component, and (b) 5–50 parts by weight and preferably 5–45 parts by weight of a polymerizable addition reaction product of an α, β-ethylenically unsaturated acid and epoxy compound in an amount of about 0.1–10.0 times the number of moles of acid employed. The films or coatings formed from such a coating composition comprise a polymer which has a hydroxyl group and an epoxy component in its molecule and which, after solvent evaporation, exhibits a superior and excellent balance between crack resistance, shrink resistance, recoatability, and gasoline resistance. In addition, the films have excellent hardness, impact resistance and flexibility, as well as exhibiting The qualities of colorlessness, transparency, gloss retention and yellow resistance, normally associated with methyl methacrylates.

The term "methyl methacrylate lacquer-giving compound" is well understood in the art and is used herein in accordance with its well known meaning. Generally speaking, methyl methacrylate lacquer-giving compounds are those compounds composed of methyl methacrylate either alone or in admixture with copolymerizable monomers in an amount insufficient to destroy the "methyl methacrylate" properties of the lacquer. Generally speaking, the monomer(s) copolymerizable with the methyl methacrylate should not exceed about 2–30 percent by weight of the methyl methacrylate since at percentages greater than about 30 percent by weight the lacquer starts to lose those properties and characteristics associated with methyl methacrylate.

The above-mentioned copolymerization of the methyl methacrylate lacquer-giving polymerizable monomer with the said addition reaction product may generally be effected by heating an admixture of these two ingredients at a temperature of 70° C to 160° C in the presence of a polymerization initiator as will be illustrated more fully hereinafter. For the purposes of this invention it is important that the copolymer formed be solvent soluble so that substantially no gelation occurs in the coating composition or during copolymerization. Thus, the copolymer formed should not be convertible during copolymerization into a cross-linked insoluble copolymer or a copolymer which is insoluble because of its very high molecular weight.

By the term "solvent soluble" is meant a copolymer which is soluble at operating temperatures in conventional methyl methacrylate lacquer solvents.

When a monoepoxide compound is used to form the addition reaction product in accordance with this invention, a monoester is formed with the α, β-ethylenically unsaturated acid. The copolymerization product formed from this monoester and the methyl methacrylate monomer is generally soluble under all operating and environmental conditions in the conventional methyl methacrylate lacquer solvents. However, when a diepoxide or other polyepoxide compound is used, diesters tend to form during the addition reaction, which diesters if present in sufficient amounts, will render the copolymer product insoluble at ambient temperatures or under the temperatures of copolymerization, thus causing the coating compositions either during copolymerization or upon storage to form undesirable, and often inoperable, insoluble gels.

It has been found, and with partial reference to the above, that the compositions of the subject invention must have three basic characteristics in order to provide a solvent soluble (i.e., non-gelling) composition which forms films having an excellent and superior balance between shrink resistance, recoatability, gasoline resistance, and crack resistance:

1. Firstly, the methyl methacrylate lacquer-giving monomer must be used in an amount of at least about 50 percent by weight and preferably 55 percent by weight or greater, so that the coating composition retains sufficient solubility characteristics and those desirable qualities normally associated with methyl methacrylates;

2. Secondly, the amount of diester (e.g., divinyl monomer) formed during the addition reaction of the epoxide and α, β-ethylenically unsaturated acid must be maintained below that amount which will cause gelation to occur; and 3. Thirdly, as a general rule, at least 10 percent of the α, β-ethylenically unsaturated acid must be reacted with the epoxy compound during the addition reaction so that the necessary 5-50 parts by weight of the monoester will be copolymerized with the methyl methacrylate lacquer-giving monomer without the expensive necessity of first having to isolate the monoester from its addition reaction mass.

As can be seen, (2) and (3) above actually work in contradistinction to one another since the amount of diester increases as the amount of acid reacted during the addition reaction increases. Thus, (2) and (3) above must be carefully balanced if the unique results of this invention are to be economically and efficiently achieved.

There are several ways in which the amount of diester formed during the addition reaction can be kept at a minimum. Firstly, one may use a monoepoxide or a mixture of mono- and polyepoxides such that the amount of diester formed is either zero or below the maximum that can be tolerated. The use of monoepoxides is not always convenient or possible since, for example, in many instances polyepoxides are more available and more economically used. In addition, it has been found desirable in some instances to have an unreacted epoxide group remain in the system. Thus, diepoxides, as the most preferred type of polyepoxides, are often more desirable to use.

The addition reaction between a diepoxide and α, β-ethylenically unsaturated acid may be exemplified by the following formula:

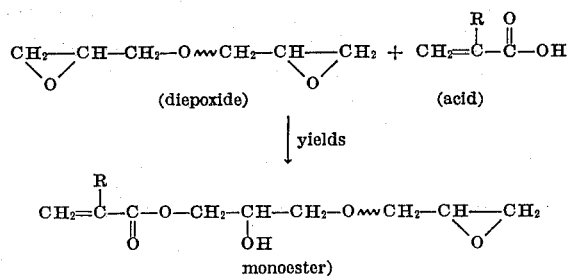

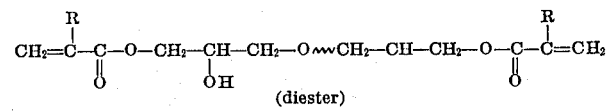

The longer the addition reaction is allowed to proceed and the more acid that is allowed to react, the greater will be the amount of diester formed. Thus, the invention includes within its scope means by which the amount of diester formed may be controlled so that the copolymerization step which follows the addition reaction will not form an insoluble gel.

The first manner of controlling the diester is to include within the ingredients of the addition reaction a chain transfer agent in an amount sufficient to maintain the amount of diester formed below that point at which gelation will occur during copolymerization. Although the amount of agent needed will differ as different systems are employed, it has been found, for example, that when lauryl mercaptan is used as the chain transfer agent, it should be used in an amount greater than 2.5 times the mole of the maximum amount of diester that can be tolerated. Examples of other chain transfer agents that can be used include n-butylmercaptan, n-dodecylmercaptan, tert-butylmercaptan, ethyl thioglycolate, benzenethiol and isopropylmercaptan.

It is not always desirable, economical, or possible to use a chain transfer agent, for example, in those systems which cannot tolerate the presence of such a chemical in the final product. For this reason, this invention also contemplates controlling the addition reaction through its operating conditions in order to limit the amount of diester formed as more fully explained hereinafter.

The actual amount of monoester that must be present, and conversely the actual amount of diesters that can be tolerated in order to insure against gelation during polymerization will vary over a wide range depending upon the type polymers used, the type solvent employed, and the like. Therefore, each system will have its own tolerance limit.

In order to aid in ascertaining the tolerance limits for a given system, for example, when a diepoxide is used, the proportion of the monoester of a diepoxide and the diester of a diepoxide produced when the diepoxide is reacted with an α, β-ethylenically unsaturated carboxylic acid can be calculated according to the following equation:

1. let the amount of diepoxide moles = $E_p$
2. let the proportion of the reacted diepoxide = $x$.

At any value of $x$, the amount of diester produced i.e., the addition reaction product of one mole of diepoxide with two moles of carboxylic acid becomes $[E_p]x^2$ moles. The amount of monoester produced then becomes $2[E_p](1-x)x$ moles. Further, the amount of unreacted diepoxide becomes $[E_p](1-x)^2$ moles.

The unknown amounts of diester and monoester can be calculated from the amount of the carboxylic acid consumed. That is, let the amount of the carboxylic acid used equal $[Ac]$ moles and let the proportion of the reacted carboxyl group equal $y$. At any given value of $y$, the amount of the carboxylic acid reacted becomes $[Ac]y$ moles. Therefore:

$$[Ac]y = 2[E_p](1-x)x + 2[E_p]x^2$$

$$y = (2[E_p]/[Ac])\{(1-x)x + x^2\}$$

Thus:

$$y = (2[E_p]/[Ac])x$$

$[E_p]/[Ac]$ is a constant determined from the amount of the carboxylic acid used and the amount of the diepoxide used. The value of "y" at any given time during reaction is easily determined by routine techniques such as titration or the like, to determine the amount of acid present, and thus the amount of acid reacted. Once "y" is determined, "x" is easily calculated from which the amounts of monoester and diester can be calculated at any given time in the addition reaction. By routine and conventional techniques then, the tolerance limits of diester for any particular system may be ascertained.

The following illustrates one set of experiments conducted wherein a bifunctional epoxy resin was reacted with methacrylic acid using an $[E_p]/[Ac]$ of 1:1 and 1:2, respectively. The acid reaction rate ($y$) was determined by dividing the difference between the acid values before and after reaction by the acid value before reaction.

| Acid reaction rate (%) | | Unreacted epoxide (mole %) | Monoester (mole %) | Diester (mole %) |
|---|---|---|---|---|
| $[E_p]/[Ac]$ = 1/1 | $[E_p]/[Ac]$ = ½ | | | |
| 10 | 5 | 90.25 | 9.50 | 0.25 |
| 20 | 10 | 81.00 | 18.00 | 1.00 |
| 30 | 15 | 72.25 | 25.50 | 2.25 |
| 40 | 20 | 64.00 | 32.00 | 4.00 |
| 50 | 25 | 56.25 | 37.50 | 6.25 |
| 60 | 30 | 49.00 | 42.00 | 9.00 |
| 70 | 35 | 42.25 | 45.50 | 12.25 |
| 80 | 40 | 36.00 | 48.00 | 16.00 |
| 90 | 45 | 30.25 | 49.50 | 20.25 |
| 100 | 50 | 25.00 | 50.00 | 25.00 |

By forming various admixtures of the above addition reaction products and methyl methacrylate lacquer-giving components and copolymerizing same, the upper limit of diester tolerance for non-gelation during copolymerization for any given system may be ascertained.

Further examples of ascertaining "$y$" for other systems are shown in the following table wherein the relationship between reaction time and amount of acid consumed are ascertained by using the same acid measuring technique as described hereinabove. Reaction 1 consisted of reacting an equimolar ratio of Epikote 828 with methacrylic acid (i.e., $[E_p]/[Ac] = 1:1$) in 30 percent xylene under reflux at 140° C. Reaction 2 was similar to Reaction 1 except the solvent was 10 percent xylene and 10 percent cellosolve acetate under reflux at 150°–160° C. Reaction 3 was conducted by reacting Epikote 1001 with a double molar ratio of methacrylic acid (i.e., $[E_p]/[Ac] = 1:2$) in 30 percent xylene under reflux at 140° C. The numerical values presented are averages of a number of runs conducted. However, good reproducibility with relatively small differences were all that occurred between the runs.

| Reaction 1 | | Reaction 2 | | Reaction 3 | |
|---|---|---|---|---|---|
| Time (hr.) | y(%) | Time (hr.) | y(%) | Time (hr.) | y(%) |
| 0 | 0 | 0 | 0 | 0 | 0 |
| 1 | 7.5 | 1 | 21 | 1 | 10 |
| 2 | 14.5 | 2 | 40 | 2 | 17 |
| 3 | 20 | — | — | 3 | 25 |
| 4 | 26 | — | — | 4 | 33 |
| 5 | 30 | — | — | — | — |
| 6 | 35 | — | — | — | — |

Similarly as stated above, once given "$y$," the value of "$x$" at any given time within the systems may be calculated. Further routine copolymerization experimentation will then indicate at what point the addition reaction should be terminated so as to provide an addition reaction product that will be sufficiently low in the diester component to prevent any substantial amount of gelation from occurring during copolymerization and formation of a coating composition.

By the above routine experimentation, a control system based upon addition reaction time and/or amount of acid consumed may be worked out for any given polymeric system. Obviously, on a commercial basis where one is producing a preferred commercial product, this routine experimentation will comprise almost a negligible part of the start-up time normally associated with such an operation. Thus a technique is hereby disclosed for controlling the amount of diester formed and thus insuring against gelation upon copolymerization simply by measuring reaction time and without the need to use monoepoxides or chain transfer agents.

For the purposes of this invention, any well known methyl methacrylate lacquer-giving component (sometimes referred to as "monomer") may be used. This component or monomer may be comprised of methyl methacrylate monomer alone or it may be comprised of an admixture of methyl methacrylate and a monomer copolymerizable therewith not exceeding about 30 percent by weight of the methyl methacrylate and preferably from about 2–30 percent thereof.

Examples of monomers copolymerizable with methyl methacrylate which may be used for the purposes of this invention include acrylates of an alkanol having one to 18 carbon atoms, methacrylates of an alkanol having two to 18 carbon atoms, vinyl acetate, vinyl propionate, styrene, vinyl toluene, acrylonitrile, diesters of maleic or fumaric acid with alkanols having one to four carbon atoms, glycidyl acrylate, glycidyl methacrylate, acrylamide, methacrylamide, and derivatives thereof. Of these monomers, the first two named are most preferred.

Examples of $\alpha, \beta$-ethylenically unsaturated acids useful in the addition reaction for the purposes of this invention include any of those well known materials such as acrylic, methacrylic, crotonic, itaconic, maleic and fumaric acids. Of these methacrylic acid is preferred.

Examples of monoepoxides which may be used in accordance with this invention include conventional and well known monoepoxides such as epichlorohydrin, glycidol, ethylglycidyl ether, butylglycidyl ether, 2-ethylhexylglycidyl ether, phenyl-glycidyl ether and Cardura E which is a monoepoxide produced by Shell Chemical Co. and represented by the formula:

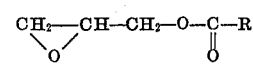

wherein R is a $C_8$ to $C_{10}$ tertiary fatty acid residue.

Examples of polyepoxides, including diepoxides which may be used for the purposes of this invention include those conventional polyepoxides well known in the industry such as for example, those polyepoxy compounds obtained by the condensation reaction of bisphenol A with epichlorohydrins, and those polyepoxides represented by the formulas:

(1) 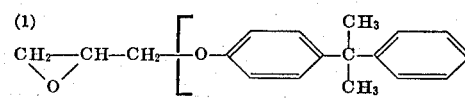

wherein n is 0–18, or (2) 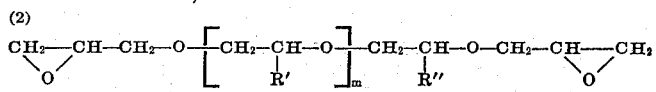

wherein $m$ is about 3 to about 5.6 and $R'$ and $R''$ are organic radicals.

The compounds of formula (1) or (2) above may be purchased under the following trademarks:

"Epikote" 562, 815, 820, 828, 834, 871, 872, 1001, 1004, 1008, 1009 and 1031 produced by Shell Chemical Co.,; "Araldite" 6071, 7071, 7072, 7097, 6097, 6099, GY 250, GY 225, GY 260 and GY 280 produced by Ciba Ltd., and "DER" 330, 331, 332, 334, 335, 336, 337, 660, 661, 662, 664, 667, 668, 669, 732 and 736 produced by Dow Chemical Co.

Epikote 828 or 1001, for example, are represented by formula (1) above wherein n is about 1 to about 2. "DER" 732, as another example, is represented by formula (2) above wherein $m$ is about 5.

In carrying out the above-described addition reaction, the $\alpha, \beta$-ethylenically unsaturated acid is reacted with the epoxy compound at a temperature of 80° to 200° C in the presence of a radical polymerization inhibitor such as hydroquinone or hydroquinone monomethyl ether while one or more of the above diester controls is effected upon the system until at least 10 percent of the acid is consumed.

In the present invention, unreacted carboxyl acid and unreacted epoxy compound may be left in the copolymer mass in various proportions by varying the proportions of $\alpha,\beta$-ethylenically unsaturated acid and epoxy resin within the ranges regulated in the invention and the extent of the addition reaction thereof. The presence of each unreacted carboxyl group and free epoxy compound has no substantial detrimental effect on the film-forming efficiency of the resulting coating composition since at least 10 percent of the acid is cosumed and formed primarily into a monoester "-monomer." On the contrary, a suitable amount of the carboxyl group present in the copolymer, when formed into a coating composition, materially aids wettability and miscibility with pigments, and the free epoxy resin as well as unreacted epoxy groups serve as plasticizers in the composition.

The copolymer of the present invention can be prepared according to any of the known methods for polymerizing methyl methacrylate. Preferably, the polymerization is effected in a solution at 70°–160° C in the presence of a polymerization initiator such as a peroxide or azo compound. During polymerization the viscosity of the solution in certain systems may become unreasonably high. In such instances, the viscosity may be controlled by the use of any well known chain transfer agent such as lauryl mercaptan and the like.

As solvents for the preparation of the copolymers and coating compositions of the present invention, there may be used solvents conventionally used for coating compositions, such as aliphatic, alicyclic and aromatic hydrocarbons, halogenated hydrocarbons, ethers, esters, ketones and alcohols. Of these, ethyl acetate, butyl acetate, methyl-ethylketone, methylisobutylketone, toluene, xylene and ethylene glycol monoethyl ether acetate are frequently used.

The coating compositions of this invention may also be used as so-called "composite lacquers" by incorporation therein of a cellulose derivative. In such instances, the amount of cellulose derivative is preferably up to about 100 parts by weight per 100 parts by weight of the copolymer. If the amount is more than said limit, the advantageous characteristics of the copolymers of the present invention tend to be diminished or lost. Examples of such cellulose derivatives include nitrocellulose, cellulose acetate, cellulose propionate, cellulose acetate butyrate and the like. Further, a solvent-soluble alkyd resin or vinyl resin may also be added in such an amount as not to substantially detract from the improved characteristics of the copolymer as described above.

Many known plasticizers, which have heretofore been used in methyl methacrylate lacquers, may also be employed in the present compositions. These plasticizers include, for example, benzylbutyl phthalate, dibutyl phthalate, triphenyl phosphate, 2-ethylhexylbenzyl phthalate and dicyclohexyl phthalate. These plasticizers may be used in proportions of 5–30 parts by weight per 100 parts by weight of the copolymers.

In those instances where a transparent film is not necessary, the coating compositions of the present invention may be colored by the addition of pigments. Examples of pigments useful herein include oxides, hydroxides, silicates, chromates, sulfides, sulfates and carbonates of metals, various organic pigments, carbon blacks and metal flake pigments. These pigments may be used in conventional amounts. Further, surface active agents, such as agents that reduce flooding, floating or silking which are ordinarily used in very slight amounts in preparing paints, may also be added to the coating compositions of this invention.

The above-mentioned components which may be used in the coating compositions of this invention are insoluble therein according to known techniques for producing conventional methyl methacrylate lacquers.

The present coating compositions may be applied onto materials to be coated by any means such as flowing, dip coating, spray coating, brush coating, roller coating and the like. However, the most preferably coating means is spray coating.

The present coating compositions dry even at room temperature to give sufficiently hard films, but more preferable films can be obtained when the compositions are forcibly dried at 80°–200° C for 1–50 minutes.

The present coating compositions are excellent in adhesion and recoatability and hence can be applied to many materials. The compositions are prominent also in weather resistance, so that they are most effectively used as automotive finishing paints.

The present invention will be illustrated in further detail below with reference to examples, in which all the parts and percentages are by weight unless otherwise indicated.

EXAMPLE 1

1-(a)

| | |
|---|---|
| Butylglycidyl ether | 103.00 parts |
| Methacrylic acid | 130.00 parts |
| Ethylene glycol monoethyl ether acetate | 100.00 parts |
| Hydroquinone | 0.05 parts |

The above materials were charged in a reactor, and the addition reaction of the epoxy group of butylglycidyl ether with the carboxyl group of methacrylic acid was effected with stirring at 150°–170° C for 7 hours. This addition reaction may be effected in the presence of an amine catalyst such as triethylamine or may be effected merely at an elevated temperature as shown above. Since butylglycidyl ether used was a monoepoxide, there was no fear that a diester would be formed.

From the above reaction mixture, ethyleneglycol monoethyl ether acetate and unreacted butylglycidyl ether and methacrylic acid were first removed by distillation at 50°–54° C/3–15 mmHg, and then the addition reaction product of methacrylic acid and butylglycidyl ether was obtained at 105° C/2 mmHg. Although extraction was not absolutely necessary, it was particularly preferred for the purposes of this experiment.

1-(b)

| | |
|---|---|
| Methyl methacrylate | 85.0 parts |
| Addition reaction product obtained in 1-(a) | 15.0 parts |
| Xylene | 60.0 parts |
| Toluene | 45.0 parts |

The above materials were charged in a reactor provided with a stirrer and the mixture was heated to reflux. To the mixture maintained in a reflux state, a solution of 1.0 part of azobisisobutyronitrile and 45.0 parts of ethyl acetate was added dropwise in a period of 2 hours to effect the polymerization reaction. After the dropwise addition, the mixture was heated with reflux for an additional 2 hours. The resulting resin solution had a non-volatile content of 40 percent and a viscosity of K as measured by a Gardner-Holdt bubble viscometer.

EXAMPLE 2

2-(a)

| | |
|---|---|
| "Cardura E" (as hereinbefore defined) | 750.00 parts |
| Methacrylic acid | 301.00 parts |
| Xylene | 263.00 parts |
| Hydroquinone monomethyl ether | 0.15 parts |

The above materials were charged in a reactor, and the mixture was heated to 140° C with stirring. The epoxy group of "Cardura E" was strong in reactivity, and the reaction was completed in about 40 minutes to give an addition reaction product of "Cardura E" and methacrylic acid. Since "Cardura E" is a monoepoxide, no fear of diester formation existed. The addition reaction product may be isolated as in the case of Example 1-(a), but the isolation thereof is not necessary, and thus the addition product may be used as such in the form of a xylene solution. In the subsequent reactions, the addition product was used in the form of a xylene solution.

2-(b)

| | |
|---|---|
| Addition product solution obtained in Example 2-(b) | 95.0 parts |
| Methyl methacrylate | 225.0 parts |
| Xylene | 181.0 parts |
| Toluene | 150.0 parts |

A mixture of the above materials and a solution of 4.0 parts of azobisisobutyronitrile and 100.0 parts of ethyl acetone were used to effect polymerization in the same manner as in Example 1-(b). The resulting resin solution had a non-volatile content of 40 percent and a viscosity of V.

EXAMPLE 3

| | |
|---|---|
| Addition product solution obtained in Example 2-(a) | 94.0 parts |
| Methyl methacrylate | 175.0 parts |
| Xylene | 131.0 parts |
| Toluene | 112.5 parts |

A mixture of the above materials and a solution of 3.0 parts of azobisisobutyronitrile and 112.5 parts of ethyl acetate were used to effect polymerization in the same manner as in Example 1-(b). The resulting resin solution had a non-volatile content of 40 percent and a viscosity of X.

EXAMPLE 4

4-(a)

| | |
|---|---|
| "Epikote" 828 (as defined above) | 700.00 parts |
| Methacrylic acid | 172.00 parts |
| Ethylene glycol monoethyl ether acetate | 109.00 parts |
| Xylene | 109.00 parts |
| Hydroquinone monomethyl ether | 0.09 parts |

The above materials were charged in a reactor and the mixture was reacted at a solvent reflux temperature of 140°–150° C. The addition reaction of the diepoxide "Epikote" 828 with the carboxyl group of methacrylic acid was traced by measuring the decrease in amount of carboxyl group in the system as described hereinabove. In a period of 40–50 minutes, 20 percent of the methacrylic acid was addition-reacted. By routine preliminary experimentation the 40–50 minute reaction time is obtained so as to insure that no gelation will occur during copolymerization due to the presence of excess diester.

4-(b)

| | |
|---|---|
| Addition product solution obtained in Example 4-(a) | 133.0 parts |
| Methyl methacrylate | 270.0 parts |
| Lauryl mercaptan | 3.0 parts |
| Xylene | 272.0 parts |

A mixture of the above materials and a solution of 2.4 parts of azobisisobutyronitrile and 75.0 parts of ethyl acetate were used to effect polymerization in the same manner as in Example 1-(b). The resulting resin was a solution with substantially no gelation and had a non-volatile content of 50 percent and a viscosity of $Z_4$.

EXAMPLE 5

| | |
|---|---|
| Addition product solution obtained in Example 2-(a) | 56.2 parts |
| Addition product solution obtained in Example 4-(a) | 56.2 parts |
| Methyl methacrylate | 210.0 parts |
| Lauryl mercaptan | 2.0 parts |
| Xylene | 118.0 parts |
| Toluene | 100.0 parts |

A mixture of the above materials and a solution of 3.0 parts of azobisisobutyronitrile and ethyl acetate were used to effect polymerization in the same manner as in Example 1-(b). The resulting resin was a solution with no gelation and had a non-volatile content of 50 percent and a viscosity of $Z_6<$.

EXAMPLE 6

| | |
|---|---|
| Addition product solution obtained in Example 2-(a) | 100.0 parts |
| Methyl methacrylate | 300.0 parts |
| n-Butyl acrylate | 20.0 parts |
| Xylene | 220.0 parts |
| Toluene | 180.0 parts |

A mixture of the above materials and a solution of 5.0 parts of azobisisobutyronitrile and 180.0 parts of ethyl acetate were used to effect polymerization in the same manner as in Example 1-(b). The resulting resin solution had a non-volatile content of 40 percent and a viscosity of U.

EXAMPLE 7

| | |
|---|---|
| Addition product solution obtained in Example 4-(a) | 125.0 parts |
| Methyl methacrylate | 360.0 parts |
| n-Butyl acrylate | 40.0 parts |
| Lauryl mercaptan | 2.6 parts |
| Xylene | 375.0 parts |

A mixture of the above materials and a solution of 4.0 parts azobisisobutyronitrile and 100.0 parts of ethyl acetate were used to effect polymerization in the same manner as in Example 1-(b). The resulting resin solution had a non-volatile content of 50 percent and a viscosity of $Z_6$.

EXAMPLE 8

8-(a)

| | |
|---|---|
| "Epikote" 1001 (diepoxide as defined above) | 450.00 parts |
| Methacrylic acid | 86.00 parts |
| Ethylene glycol monoethyl ether acetate | 136.00 parts |
| Hydroquinone | 0.03 parts |

The above materials were charged in a reactor and the mixture was subjected to addition reaction at 150°–160° C. In a period of about 2 hours, 15 percent of the methacrylic acid was addition reacted. This point of time is optimal from the point of balancing a sufficient amount of monoester formed for copolymerization and an insufficient amount of diester formed so as to prevent any gelation. During this addition reaction the consumption of acid was measured as described and the amounts of diester and monoester calculated with the following results:

| Methacrylic acid consumed (Mole %) | Monoester (Mole %) | Diester (Mole %) |
|---|---|---|
| 5 | 9.5 | 0.25 |
| 10 | 18.0 | 1.00 |
| 15 | 25.5 | 2.25 |
| 20 | 32.0 | 4.00 |
| 25 | 37.5 | 6.25 |

Further experimentation revealed that not only is the 15 mole percent acid consumption optimal, but that at 100 percent acid consumption, the copolymerization product formed therefrom is a totally solvent-insoluble copolymer not capable of being used in a coating composition because it forms an insoluble gel in the solvent.

8-(b)

| | |
|---|---|
| Addition product solution obtained in Example 8-(a) | 100.0 parts |
| Methyl methacrylate | 344.0 parts |
| 2-Ethylhexyl acrylate | 38.4 parts |
| Lauryl mercaptan | 2.0 parts |
| Xylene | 350.0 parts |

A mixture of the above materials and a solution of 3.3 parts of azobisisobutyronitrile and 92.5 parts of ethyl acetate were used to effect polymerization in the same manner as in Example 1-(b). The resulting resin was a non-gelling solution and had a non-volatile content of 50 percent and a viscosity of $Z_5$.

EXAMPLE 9

9-(a)

| | |
|---|---|
| "DER" 732 (as defined above) | 320.00 parts |
| Methacrylic acid | 86.00 parts |
| Xylene | 101.00 parts |
| Hydroquinone | 0.04 parts |

The above materials were charged in a reactor and the mixture was subjected to addition reaction at 140°–150° C. In a period of about 1 hour, 20 percent of the methacrylic acid was addition reacted. It is also found by routine experimentation that at this time, temperature, and acid consumption level, the amount of diester formed is too little to cause any gelation during copolymerization.

9-(b)

| | |
|---|---|
| Addition product solution obtained in Example 9-(a) | 75.0 parts |
| Methyl methacrylate | 216.0 parts |
| n-Butyl acrylate | 24.0 parts |
| Lauryl mercaptan | 1.5 parts |
| Xylene | 105.0 parts |
| Toluene | 120.0 parts |

A mixture of the above materials and a solution of 3.0 parts of azobisisobutyronitrile and 60.0 parts of ethyl acetate were used to effect polymerization in the same manner as in Example 1-(b). The resulting resin was a non-gelling solution and had a non-volatile content of 50 percent and a viscosity of $Z_2$.

EXAMPLE 10

| | |
|---|---|
| Addition product solution obtained in Example 2-(a) | 56.2 parts |
| Addition product solution obtained in Example 4-(a) | 56.2 parts |
| Methyl methacrylate | 178.5 parts |
| n-Butyl methacrylate | 31.5 parts |
| Lauryl mercaptan | 3.0 parts |
| Xylene | 109.5 parts |
| Toluene | 108.0 parts |

A mixture of the above materials and a solution of 3.0 parts of azobisisobutyronitrile and 60.0 parts of ethyl acetate were used to effect polymerization in the same manner as in Example 1–(b). The resulting resin was a solution and had a non-volatile content of 50 percent and a viscosity of Z.

In forming a transparent film by use of the resin solution obtained in each of the above examples, the resin solution may be charged with a diluting solvent so as to have a viscosity suitable for coating and then applied to a material to be coated. In case the solution is to be used as a pigmented enamel, it is incorporated with pigments such as a leafing aluminum pigment, coloring matter and titanium oxide and, if necessary, a very slight amount of an agent that reduces flooding, floating or silking, and is then subjected to such operation as mechanical impact, abrasion or stirring, whereby a smooth enamel is obtained. The thus obtained enamel may be charged with a diluting solvent so as to have a viscosity suitable for coating and then applied to a material to be coated.

Typical values of efficiencies of films formed from coating materials using the resins obtained in the above examples are summarized in Table 1, in which "Alpaste 1109A" (trade name for aluminum metal paste of Toyo Aluminum K.K.) was used as the leafing aluminum pigment, "Microlith 4GT Blue" (product of Ciba Ltd.) as the coloring matter, and "Rutile-type Titanium Oxide R-820" (product of Ishihara Sangyo K.K.) as the titanium oxide.

Tests on the efficiencies of films formed from the thus prepared coating materials were effected in the following manners:

Each of the above coating compositions was sprayed onto a 0.8 mm thick steel panel coated with an epoxy resin-modified acrylic type primer, and was forcibly dried at 140° C for 30 minutes. Thereafter, the coating composition was again applied onto the coated steel panel and was then forcibly dried at 140° C for 30 minutes. The thickness of the film formed after drying was controlled so that the thickness of the primer became 40 $\mu$ and that of the present coating material became 40–50 $\mu$. The gloss of the sprayed film as such was evaluated by means of a gloss meter when the angle was 60°. The hardness of the film was evaluated according to pencil hardness and was represented by a maximum pencil hardness attained when the film was subjected to ordinary procedure without forming scratches. The impact strength was measured, by means of a DuPont Impact tester, using a 500 g. weight of ½ inch diameter. The adhesion was measured in such a manner that by means of a needle, one hundred squares of 2 × 2 mm were formed on the film, and an adhesive tape was applied onto the film and was then vigorously peeled off. If no squares of the film had been peeled off, the adhesion of the film was evaluated to be "passed". The hot water resistance was tested by immersing the film in city water at 40° C for 240 hours. The gasoline resistance was evaluated by immersing the film in commercially available gasoline at room temperature for 24 hours and observing the appearance of the obtained film and measuring the pencil hardness thereof.

TABLE 1

| Example No. | 1 | 2 | 3 | | 4 | 5 | | 6 | | 7 | | | |
|---|---|---|---|---|---|---|---|---|---|---|---|---|---|
| Coating material composition: | | | | | | | | | | | | | |
| Resin solution of example (a) (parts by weight) | 250 | 250 | 250 | 175 | 250 | 175 | 140 | 200 | 250 | 175 | 250 | 175 | 200 | 140 |
| ½ sec. NC solution (b) (parts by weight) | | | | | | | | | | | | | | |
| ½ sec. CAB solution (c) (parts by weight) | | | | 150 | | 150 | | | | 150 | | 150 | | 150 |
| Rutile titanium oxide (parts by weight) | | | | | 40 | 40 | 40 | | | | 40 | 40 | | |
| Leafing aluminum pigment (parts by weight) | 4 | 4 | 4 | 4 | | | | 4 | 4 | 4 | | | 4 | 4 |
| Coloring matter (parts by weight) | 3 | 3 | 3 | 3 | | | | 3 | 3 | 3 | | | 3 | 3 |
| Film efficiencies: | | | | | | | | | | | | | | |
| Recoating | (1) | (1) | (1) | (1) | (1) | (1) | (1) | (1) | (1) | (1) | (1) | (1) | (1) | (1) |
| Gloss (d) | 91 | 87 | 91 | 84 | 90 | 88 | 87 | 90 | 91 | 88 | 90 | 89 | 92 | 92 |
| Pencil hardness | 2H | 3H | 2H | 2H | 2H | H | 3H | 2H | 2H | H | 2H | 2H | 2H | 2H |
| Impact strength (cm.) | 25 | 25 | 30 | 20 | 25 | 30 | 20 | 25 | 25 | 30 | 25 | 30 | 30 | 30 |
| Adhesion test | (2) | (2) | (2) | (2) | (2) | (2) | (2) | (2) | (2) | (2) | (2) | (2) | (2) | (2) |
| Gasoline resistance: | | | | | | | | | | | | | | |
| Appearance observation | (3) | (3) | (3) | (3) | (3) | (3) | (3) | (3) | (3) | (3) | (3) | (3) | (3) | (3) |
| Hardness retention | 2H | F | B | H | H | H | 3H | HB | B | HB | F | H | 2H | 2H |
| Hot water resistance | (1) | (1) | (1) | (1) | (1) | (1) | (1) | (1) | (1) | (1) | (1) | (1) | (1) | (1) |

1 Excellent.    2 Passed.    3 Good.

| Example No. | 8 | | 9 | | | | |
|---|---|---|---|---|---|---|---|
| Coating material composition: | | | | | | | |
| Resin solution of example (a) (parts by weight) | 200 | 180 | 140 | 200 | 200 | 250 | 250 |
| ½ sec. NC solution (b) (parts by weight) | | 50 | | | | | |
| ½ sec. CAB solution (c) (parts by weight) | | | 150 | | | | |
| Rutile titanium oxide (parts by weight) | | | | 40 | | 40 | |
| Leafing aluminum pigment (parts by weight) | 4 | 4 | 4 | | 4 | | 4 |
| Coloring matter (parts by weight) | 3 | 3 | 3 | | 3 | | 3 |
| Film efficiencies: | | | | | | | |
| Recoating | (1) | (1) | (1) | (1) | (1) | (1) | (1) |
| Gloss (d) | 93 | 93 | 92 | 89 | 92 | 92 | 94 |
| Pencil hardness | 2H | 3H | 3H | 3H | 3H | 3H | 3H |
| Impact strength (cm.) | 20 | 20 | 30 | 30 | 25 | 25 | 20 |
| Adhesion test | (2) | (2) | (2) | (2) | (2) | (2) | (2) |
| Gasoline resistance: | | | | | | | |
| Appearance observation | (3) | (3) | (3) | (3) | (3) | (3) | (3) |
| Hardness retention | F | H | 3H | 2H | B | B | B |
| Hot water resistance | (1) | (1) | (1) | (1) | (1) | (1) | |

NOTE:

a. Resin solutions of Examples 1, 2, 3 and 6 have individually a non-volatile content of 40 percent, and those of Examples 4, 5, 7, 8, 9 and 10 have a non-volatile content of 50 percent.

b. ½ sec. NC solution = a solution comprising 20 parts of ½ sec. nitrocellulose, 16 parts of methylethylketone and 64 parts of methylisobutylketone.

c. ½ sec. CAB solution — a solution comprising 20 parts of ½ sec. cellulose acetate butyrate, 20 parts of ethyl acetate, 16 parts of methylisobutylketone, 12 parts of ethylene glycol monoethyl ether acetate, 8 parts of sec.-butanol and 24 parts of toluene.

d. When polished, every film shows a gloss of 94 or more.

We claim:

1. A coating composition consisting essentially of an organic solvent soluble copolymer obtained from the copolymerization reaction of (a) 50–95 parts by weight of a member selected from the group consisting of (1) methyl methacrylate and (2) an admixture of methyl methacrylate and 2–30 percent by weight of a monomer copolymerizable therewith selected from acrylates of an alkanol having one to 18 carbon atoms, methacrylates of an alkanol having two to 18 carbon atoms, vinyl acetate, vinyl propionate, styrene, vinyl toluene, acrylonitrile, diesters of maleic acid with alkanols having one to four carbon atoms, diesters of fumaric acid with alkanols having one to four carbon atoms, glycidyl acrylate, glycidyl methacrylate, acrylamide and methacrylamide; and (b) 5–50 parts by weight of a polymerizable addition reaction product of an α,β-ethylenically unsaturated acid and a polyepoxy compound in an amount of about 0.1–10.0 times the number of moles of said acid employed.

2. A coating composition in accordance with claim 1 wherein at least 10 percent of the acid employed is allowed to react with said epoxy compound.

3. A coating composition in accordance with claim 1 wherein said epoxy compound is a polyepoxide and there is an insufficient amount of diester formed during said addition reaction to cause gelation to occur during said copolymerization.

4. A coating composition in accordance with claim 1 wherein said member (a) is present in an amount of from 55–95 percent by weight and said addition reaction product is present in an amount of from 5–45 percent by weight.

5. A coating composition in accordance with claim 1 which also includes a coloring pigment.

6. A method of forming the coating composition of claim 1 comprising copolymerizing (a) 50–95 parts by weight of a member selected from the group consisting of (1) methyl methacrylate and (2) an admixture of methyl methacrylate and 2–30 percent by weight of a monomer copolymerizable therewith selected from acrylates of an alkanol having one to 18 carbon atoms, methacrylates of an alkanol having two to 18 carbon atoms, vinyl acetate, vinyl propionate, styrene, vinyl toluene, acrylonitrile, diesters of fumaric acid with alkanols having one to four carbon atoms, diesters of maleic acid with alkanols having one to four carbon atoms, glycidyl acrylate, glycidyl methacrylate, acrylamide, and methacrylamide; and (b) 5–50 parts by weight of a polymerizable addition reaction product obtained by reacting an α,β-ethylenically unsaturated acid and a polyepoxy in an amount of about 0.1–10.0 times the number of moles of said acid employed; and controlling the amount of diester formed during said addition reaction below that point at which gelation will occur during copolymerization by a control step which comprises using a chain transfer agent during said addition reaction and/or said copolymerization.

7. A method of forming the coating composition of claim 1 comprising copolymerizing (a) 50–95 parts by weight of a member selected from the group consisting of (1) methyl methacrylate and (2) an admixture of methyl methacrylate and 2–30 percent by weight of a monomer copolymerizable therewith selected from acrylates of an alkanol having one to 18 carbon atoms, methacrylates of an alkanol having two to 18 carbon atoms, vinyl acetate, vinyl propionate, styrene, vinyl toluene, acrylonitrile, diesters of fumaric acid with alkanols having one to four carbon atoms, diesters of maleic acid with alkanols having one to four carbon atoms, glycidyl acrylate, glycidyl methacrylate, acrylamide, and methacrylamide; and (b) 5–50 parts by weight of a polymerizable addition reaction product obtained by reacting an α,β-ethylenically unsaturated acid and a polyepoxy in an amount of about 0.1–10.0 times the number of moles of said acid employed; and controlling the amount of diester formed during said addition reaction below that point at which gelation will occur during copolymerization by a control step which comprises stopping said addition reaction at a time predetermined, which predetermined time indicates that insufficient amount of diester has as yet been formed to cause gelation to occur during copolymerization.

* * * * *

UNITED STATES PATENT OFFICE
CERTIFICATE OF CORRECTION

Patent No. 3,697,619     Dated October 10, 1972

Inventor(s) Nobuyoshi Nagata and Ryuzo Mizuguchi

It is certified that error appears in the above-identified patent and that said Letters Patent are hereby corrected as shown below:

In the Heading:

Foreign Priority:   Japanese Patent Application Numbers

46185/66   Filed July 16, 1966, and

46818/66   Filed July 19, 1966.

Assignee:   Nippon Paint Co., Ltd., a corporation of Japan.

Signed and sealed this 29th day of May 1973.

(SEAL)
Attest:

EDWARD M. FLETCHER, JR.
Attesting Officer

ROBERT GOTTSCHALK
Commissioner of Patents